(12) United States Patent
Eberle et al.

(10) Patent No.: US 11,452,919 B2
(45) Date of Patent: *Sep. 27, 2022

(54) BLUETOOTH ENABLED BALL ANALYZER AND LOCATOR

(71) Applicant: Graff Golf LLC, Sandy Springs, GA (US)

(72) Inventors: Michael Eberle, North Hampton, NH (US); Patrick Kelly, Mt. Airy, MD (US); Aaron Shapiro, Sandy Springs, GA (US)

(73) Assignee: Graff Golf LLC, Sandy Springs, GA (US)

( * ) Notice: Subject to any disclaimer, the term of this patent is extended or adjusted under 35 U.S.C. 154(b) by 122 days.

This patent is subject to a terminal disclaimer.

(21) Appl. No.: 17/121,586

(22) Filed: Dec. 14, 2020

(65) Prior Publication Data

US 2021/0113892 A1 Apr. 22, 2021

Related U.S. Application Data

(63) Continuation-in-part of application No. 16/438,412, filed on Jun. 11, 2019, now Pat. No. 10,864,410.

(Continued)

(51) Int. Cl.
*A63B 43/00* (2006.01)
*A63B 37/00* (2006.01)
(Continued)

(52) U.S. Cl.
CPC .......... *A63B 43/00* (2013.01); *A63B 24/0021* (2013.01); *A63B 37/0003* (2013.01);
(Continued)

(58) Field of Classification Search
CPC . A63B 43/00; A63B 24/0021; A63B 37/0003; A63B 71/0622;
(Continued)

(56) References Cited

U.S. PATENT DOCUMENTS 3,782,730 A 1/1974 Horchler
7,487,045 B1 2/2009 Vieira
(Continued)

OTHER PUBLICATIONS

Hopkins, Ruby, "Newly improved RadarGolf", May 29, 2018, webpage downloaded from http://radargolf.com/newly-improved-golf-balls/ on May 19, 2019.

(Continued)

*Primary Examiner* — John E Simms, Jr.
*Assistant Examiner* — Rayshun K Peng
(74) *Attorney, Agent, or Firm* — Richard A. Baker, Jr.

(57) ABSTRACT

A golf ball with embedded electronics to allow proximity to be tracked and to monitor golfer performance is disclosed. The golf ball comprises a processor connected to an accelerometer, communications circuitry, a spin detector, and memory, wherein the processor stores accelerometer data from the accelerometer and rotation data regarding rotation of the spin detector in the memory. The processor converts the data regarding the rotation of the spin detector into a rotation speed and a rotation direction, said rotation speed determined by a frequency of the data, and said rotation direction determined by a magnitude of the data. The communications circuitry is configured to communicate the accelerometer data, the rotation direction, and the rotation speed to a central interrogator for analysis of a golfer's performance.

14 Claims, 10 Drawing Sheets

Related U.S. Application Data

(60) Provisional application No. 62/824,820, filed on Mar. 27, 2019.

(51) Int. Cl.
*A63B 71/06* (2006.01)
*A63B 24/00* (2006.01)

(52) U.S. Cl.
CPC .. *A63B 71/0622* (2013.01); *A63B 2024/0034* (2013.01); *A63B 2071/0625* (2013.01); *A63B 2071/0694* (2013.01); *A63B 2220/35* (2013.01); *A63B 2220/40* (2013.01); *A63B 2220/833* (2013.01); *A63B 2225/52* (2013.01)

(58) Field of Classification Search
CPC ........ A63B 2024/0034; A63B 2220/34; A63B 2220/35; A63B 2220/803; A63B 2024/0028; A63B 2225/50
USPC .......................................................... 473/199
See application file for complete search history.

(56) References Cited

U.S. PATENT DOCUMENTS

| | | |
|---|---|---|
| 9,717,956 B2 | 8/2017 | Dufaux |
| 10,589,162 B2 | 3/2020 | Koo |
| 2003/0228934 A1 | 12/2003 | Corzillus |
| 2004/0142766 A1 | 7/2004 | Savarese |
| 2007/0059675 A1 | 3/2007 | Kuenzler |
| 2009/0280920 A1 | 11/2009 | Rankin |
| 2010/0227705 A1 | 9/2010 | Huang |
| 2012/0172148 A1 | 7/2012 | Freeman |
| 2015/0094168 A1 | 4/2015 | Unger et al. |
| 2015/0105173 A1* | 4/2015 | Thurman ........... G09B 19/0038 473/199 |
| 2016/0006577 A1 | 1/2016 | Logan |
| 2016/0367861 A1* | 12/2016 | Pelz ....................... A63B 71/06 |
| 2017/0261295 A1 | 9/2017 | Emrich |
| 2018/0200601 A1 | 7/2018 | Jolliffe |
| 2018/0261010 A1* | 9/2018 | Kudirka ............. A63B 24/0021 |

OTHER PUBLICATIONS

Garrity, John, "A 'Smart' Golf Ball to Track My Shots? Tell Me More!", Golf Magazine, Feb. 4, 2016.
"Golf Ball", Wikipedia, webpage downloaded from https://en.wikipedia.org/wiki/Golf_ball on May 19, 2019.
"Pitchtracker baseball", Diamond Kinetics, webpage downloaded from https://diamondkinetics.com/pitchtracker-baseball/ on May 28, 2019.
Benzenberg, Eric, "Smart Golf Balls are Here", GolfCity, Feb. 2, 2018, webpage downloaded from https://golficity.com/smart-golf-balls-are-here/ on Apr. 25, 2020.

* cited by examiner

BLUETOOTH ENABLED BALL ANALYZER AND LOCATOR

RELATED APPLICATIONS

This patent application is a continuation-in-part of U.S. patent application Ser. No. 16/438,412, "Bluetooth Enabled Ball Analyzer and Locator", filed on Jun. 11, 2019, now U.S. Pat. No. 10,864,410. U.S. patent application Ser. No. 16/438,412 is a non-provisional patent application claiming priority to US Patent Provisional Patent Application 62/824,820, "A Bluetooth chip designed to track proximity and play a sound, along with an accelerometer, that is embedded inside of a golf ball", filed on Mar. 27, 2019, by inventors Aaron Shapiro and Mike Eberle. The disclosures of the provisional and non-provisional patent applications are incorporated herein by reference in their entirety.

BACKGROUND

Technical Field

The system, apparatuses, and methods described herein generally relate to balls used in various sports and, in particular, to intelligent golf balls with communications capabilities.

DESCRIPTION OF THE RELATED ART

Golf as we know it today originated from a game played on the eastern coast of Scotland in the Kingdom of Fife during the 15th century. Players would hit a pebble around a natural course of sand dunes, rabbit runs, and tracks using a stick or primitive club. Wooden golf balls were the first man-made golf balls, invented in the 1400s. These original wooden golf balls were inefficient at best and likely made of hardwoods such as Beech or Boxroot. The first "real" golf ball was known as a "feathery" golf ball. Basically, the feathery was a leather sack filled with boiled goose feathers, then stitched up and painted. These golf balls were used from the 1400s until the 1840s. In 1848, Rev. Dr. Robert Adams began creating golf balls out of Gutta Percha "Gutty". The Gutty golf ball was created from the dried sap of the Sapodilla tree. It had a rubber-like feel and was formed into ball shapes by heating it up and shaping it while hot. It was soon discovered that dinged balls traveled further than new, smooth balls, and golf ball manufacturers added dimples to the golf balls.

In the late 1800s, the inside of the golf ball changed to a solid rubber core, high tension rubber thread wrapped around the core, and a Gutta Percha cover. Various other cores were incorporated over the following years, with liquid, steel, lead, and glycerin used at various times. Today, two-piece solid Syrlin or Balata cover rubber cored balls are used. Recent rule changes (United States Golf Association (USGA)) for standard golf balls have allowed for balls with hollow steel spheres surrounded with rubber. With the improved designs in golf balls, the balls travel further. However, this means that the golf ball can travel further out of sight of the golfer and are more often lost than they were in the 1800s.

On average, most golfers lose four balls per round, adding a total of 20 minutes of play just searching for their ball. This means that tens of millions of golf balls are lost each year, leading to millions of dollars in extra cost to golfers. And the 20-minute delay searching for lost golf balls slows down play on the course, leading to lost revenues for the country clubs.

There is a need for the technology of finding golf balls to catch up to the materials technology that has allowed for longer golf ball drives. The extreme number of lost golf balls creates a significant problem for golfers both in terms of cost and the inability of golfers to analyze their round. Golf balls can easily be lost in bushes and trees. They give the golfer no easy way to track golf ball movements and statistics.

There is a need for technology inside the balls to allow them to be found quickly through proximity and sound. However, each golf ball may undergo 15,000 G's of force when the golf club hits the ball. Off of the club, the ball may spin at 9000 RPMs and travel at 180 miles per hour, so the technology must be hardened to the extreme physical forces. There is also a need for a software application to give a golfer helpful analytical data.

BRIEF SUMMARY OF THE INVENTION

This document describes a system for monitoring a golfer's performance. The system is made up of two components, a golf ball, and a central interrogator.

The golf ball has embedded electronics. The golf ball comprises a processor electrically connected to golf ball communications circuitry, memory, and a spin detector electrically connected to the processor. The spin detector directs data regarding the rotation of the spin detector to the processor. The processor converts the data regarding the rotation of the spin detector into a rotation speed and a rotation direction, the rotation speed determined by a frequency of the data and said rotation direction determined by a magnitude of the data. The processor converts the data through a calculation and stores said rotation speed and said rotation direction in the memory. The golf ball mechanically encompasses the processor and the spin detector.

The central interrogator comprises a central interrogator processor, central interrogator communications circuitry electronically connected to the central interrogator processor, the central interrogator communications circuitry wirelessly connected to the golf ball communications circuitry, and a display screen electrically connected to the central interrogator processor. Application software executes on the central interrogator processor, said application software interrogates the golf ball through the central interrogator communications circuitry for the rotation speed and said rotation direction regarding the rotation of the spin detector. The application software derives analytics on the golfer's performance from the rotation speed and the rotation direction for display on the display screen.

In some embodiments. the spin detector in the golf ball is a Magnetoresistive sensor or a gyroscope, or an accelerometer. The central interrogator could be a smartphone.

The data sent by the golf ball to the central interrogator could comprises hang time, exit velocity, launch angle, and/or carry distance. The golf ball could also include a electrically connected to the processor. The central interrogator processor could wirelessly transmits an instruction to the golf ball to activate the buzzer. The central interrogator could further comprise locator software that interrogates an RSSI signal from the golf ball communications circuitry as detected by the central interrogator communications circuitry, compares a location of the central interrogator to the RSSI signal, and calculates a location of the golf ball based on a plurality of central interrogator location and RSSI signal data pairs.

A method for analyzing the performance of a game of golf is also described. The method comprises (1) detecting an impact with an accelerometer, (2) measuring rotation with a spin detector, said spin detector sending a rotation signal to a microprocessor located inside of a golf ball, said microprocessor electrically connected to a communications interface, (3) measuring acceleration with the accelerometer, said accelerometer sending an acceleration signal to the microprocessor, (4) converting the rotation signal into a rotation speed and a rotation direction, said rotation speed determined by a frequency of the rotation signal and said rotation direction determined by a magnitude of the rotation signal, through a calculation in the microprocessor, (5) storing the rotation speed, the rotation direction, and the acceleration signal in a memory electrically connected to the microprocessor; and (6) sending the rotation speed, the rotation direction, and the acceleration signal to the communications interface for transmission to a central interrogator for analysis on a golfer's performance.

A timestamp could be stored in addition to the rotation speed and the acceleration signal. The timestamp could be sent to the communications interface.

A golf ball with embedded electronics is also described here. The golf ball is made of an accelerometer, a processor electrically connected to the accelerometer, a spin director, communications circuitry, and memory, wherein the processor stores accelerometer data from the accelerometer in the memory. The spin detector directs rotation data regarding rotation of the spin detector to the processor, where the processor converts the rotation data regarding the rotation of the spin detector into a rotation speed and a rotation direction. The rotation speed is determined by the frequency of the rotation data and the rotation direction is determined by the magnitude of the rotation data. This determination is made through a calculation and the rotation speed and said rotation direction are stored in the memory. The communications circuitry is configured to communicate the accelerometer data, the rotation direction, and the rotation speed to a central interrogator for analysis of a golfer's performance.

In some embodiments, the spin detector is an accelerometer. The communications circuitry could be further configured to communicate exit velocity as calculated by the processor to the central interrogator.

DETAILED DESCRIPTION

The present inventions describe several embodiments for an improved golf ball, where the gold ball includes hardened electronics and the golf ball comprises an improved material to protect the electronics from the extreme forces the occur when the ball is hit by the club. A software application accompanies the improved golf ball to provide the golfer with an interface to the golf ball data. As stated above, the extreme number of lost golf balls and the inability of golfers to analyze their round impinges on the golfer's enjoyment of the game. The inventions described here solves this problem.

A golfer's ball can be found using proximity and tracking using sound. A golfer can view detailed analytics taken from the accelerometer and displayed on a phone via Bluetooth. The technology inside the balls allows it to be found quickly through proximity and sound, and the app gives a golfer helpful analytical data. While Bluetooth is used throughout this document, other communications techniques could be used in place of Bluetooth and BLE.

Golf Ball Design

Figure 1:
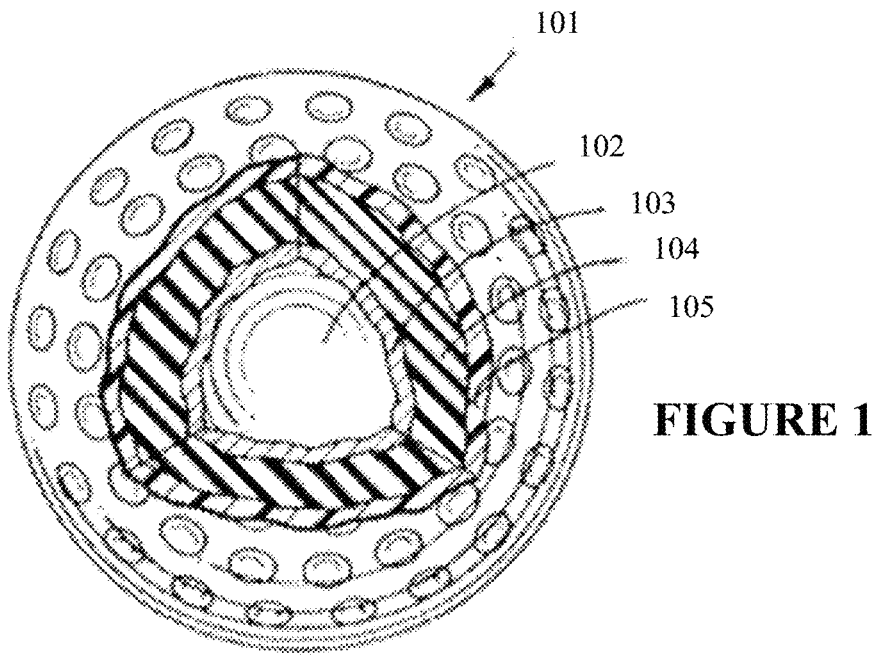
FIG. 1 is a partial cross-sectional perspective view of a golf ball including three elements: an innermost core comprised of a high stiffness sphere, a middle mantle layer, and a cover layer.

FIG. 1 shows a golf ball 101 that includes a stiff hollow spherical core 102 surrounded by a first polymer layer 103, which forms a two-part spherical body with a surface. The two-part spherical body is surrounded by cover layer 105 that includes dimples or other surface features that are known in the art to improve flight characteristics. The cover layer 105 has an outer surface with dimples and an inner surface opposite of the outer surface that defines a cavity. The outer surface and inner surface of the cover layer 105 together define a cover thickness, which is about 4 mm, but may be any thickness between about 1 mm and about 6 mm, including all values and ranges in-between, or between about 2 mm and about 5 mm. The cover layer 105 with the surface dimple pattern is made of a polymer sold under the trade name SURLYN® (manufactured by DuPont). In another example, the cover layer 105 is made of an ionomer, urethane, balata, polybutadiene, other synthetic elastomers, or any other material suitable for a golf ball cover. The cover layer 105 also forms the golf ball diameter. In one embodiment, the golf ball diameter is approximately 42.67 mm (1.68 inches), but may be any diameter equal to, greater than, or less than 42.67 mm that is capable of play. For example, USGA legal golf balls are 1.68 inches or greater in diameter. For example, the golf ball diameter may be between about 40 mm and about 45 mm, including all values and ranges in between.

The primary spherical core 102 is a polymer matrix composite, metal matrix composite, or carbon matrix composite. The diameter of the spherical core 102 may be any diameter from about 10 mm (0.39 inches) to about 38 mm (1.50 inches), including all values and ranges in-between. For example, USGA legal golf balls with stiff cores have a core diameter less than or equal to 0.9 inches. In an example, the spherical core 102 of the golf ball 101 has a diameter of less than about 31.75 mm (1.25 inches), including all values and ranges in-between. In another example, the spherical core 102 of the golf ball 101 has a diameter less than or equal to about 22.86 mm (0.90 inches). In yet another example, the spherical core 102 has a diameter from approximately 0.9 inches to approximately 0.25 inches. In one embodiment, the spherical core 102 is hollow, providing space to insert a printed circuit board (pc board) 106. In another embodiment, the pc board 106 in the spherical core 102 is surrounded by material 301, such as a polymer urethane visco-elastic material such as Sorbathane to absorb the impact of the golf club striking the golf ball. Sobathane is described in a series of patents awarded to Dr. Maurice Hiles, including U.S. Pat. Nos. 4,101,704, 4,346,205, 4,476,258, and 4,808,469, each of these patents incorporated herein by reference. In other embodiments, the Sorbathane could be replaced with Silicone, Neoprene, Norsorex, Rubber, Deflex, Gel-mec, Microsorb, Memory foam, Acoustic foam, or other similar material.

The second layer 104 is a polymer material, such as one or more of ethylene (meth)acrylic acid ionomers (such as DuPont's HPFTM resin), polyether block amide (such as the material sold under the trade name PEBAX® made by the Arkema Group), polybutadiene, or other materials known the art that are used in golf balls. The second layer 104 can be of molded construction. The second layer 104 generally has an outside diameter of about 1.52 to 1.60 inches (3.86 to 4.06 centimeters) and a thickness of 0.05 to 0.65 inches (0.13 to 1.65 centimeters), including all values and ranges in-between. In another example, the second layer 104 has an outside diameter of about 0.21 to 0.55 inches (0.53 to 1.4 centimeters).

Figure 2:
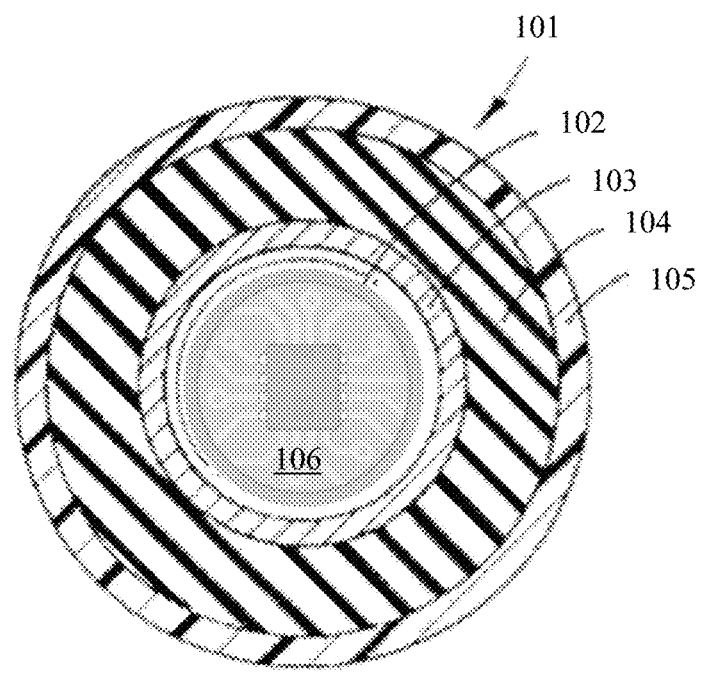
FIG. 2 is a partial cross-sectional perspective view of a golf ball including four elements: an innermost core comprised of a high stiffness sphere, the electronics in the sphere, a middle mantle layer, and a cover layer.

Another embodiment of the improved golf ball 101 is illustrated in FIG. 2. The golf ball 101 includes a stiff spherical core 102, surrounded by a thin first mantle layer 103, surrounded by a second mantle layer 104, and further surrounded by a cover layer 105.

Golf Ball Circuitry

Figure 3:
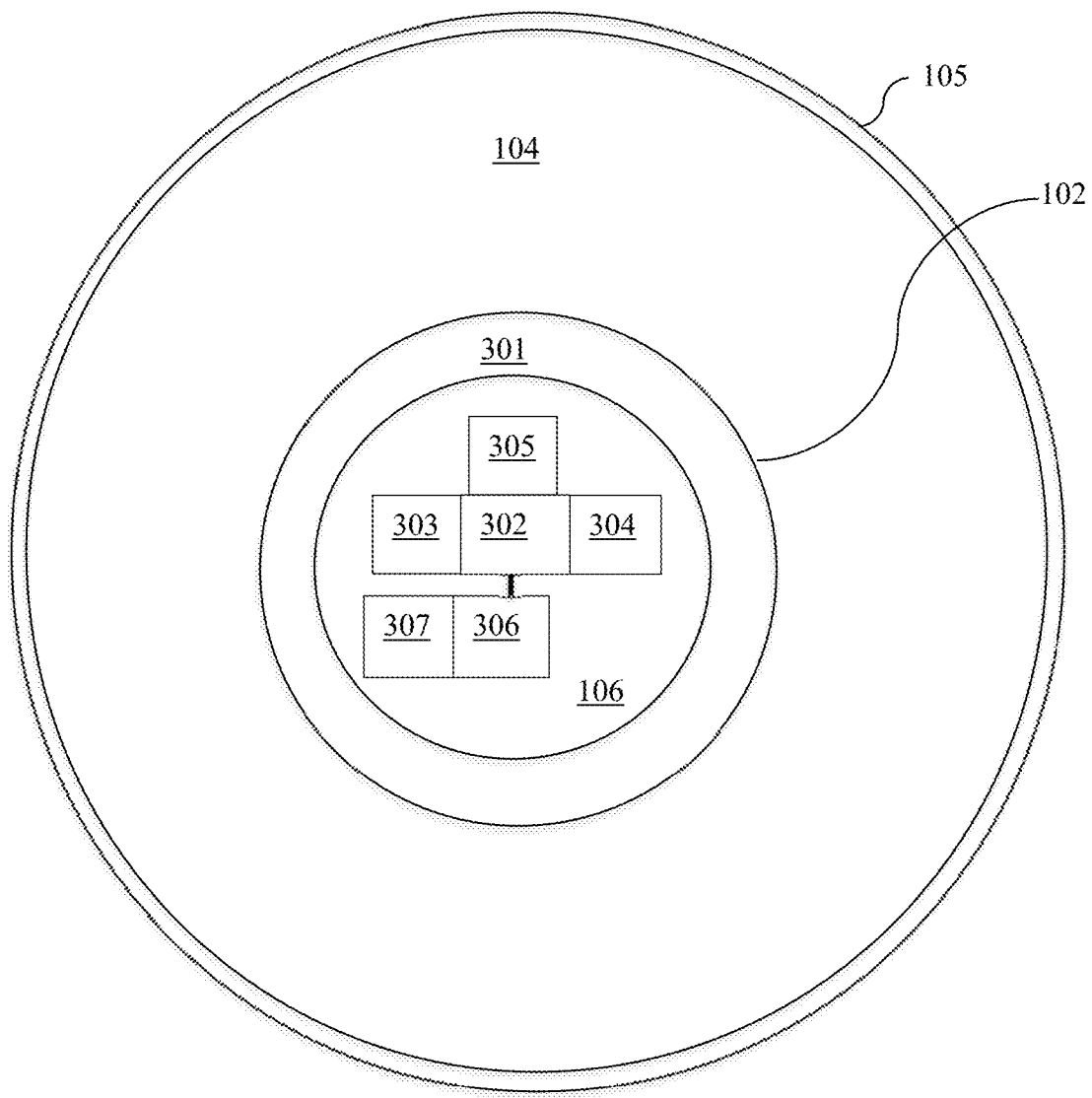
FIG. 3 shows a cross-section of a golf ball with the various electronic components.

Looking to FIG. 3, the stiff spherical core 102 is surrounded by the second layer 104, and the golf ball cover 105. Inside of the core 102 is a shock-absorbent material 301 such as a polymer urethane visco-elastic material. The shock-absorbent material 301 protects the embedded electronics, possibly mounted on a pc board 106.

The pc board 106 includes a BLE (Bluetooth Low Energy) Chip 302 such as a Nordic nRF52832 or a Cyprus Semiconductor PSOC BLE chip; a QI Wireless Charger chip 307 such as an Analog Devices LTC4124, an Accelerometer 303 such as a 1428-1060-2-ND; one or two Magnetoresistive (MR) Sensors 305, such as a TI DRV5053CAQLPGM; a Battery 306 such as a PD521417 with a power control module and cables; and a Buzzer 304, such as a 102-3746-1-ND. Each of these components are soldered into the PC Board, in one embodiment. The BLE Chip 302 includes memory, communications circuitry, and a microprocessor (BLE processor), as well as circuitry for interfacing with various sensors. In another embodiment, the BLE chip 302 has the power control module, the wireless charger 307, the accelerometer 303, and the MR sensors 305 integrated into a single integrated circuit, either as an ASIC or as a custom chip. Any combination or integration within an integrated circuit and separate components could be used without deviating from the inventions herein. In one embodiment, the components are surface mounted to the pc board, and the board could also be encased in epoxy or silicon to increase its resistance to shock.

The BLE chip 302 is electrically connected to the accelerometer 303 and the MR sensors 305 as is the buzzer 304. The buzzer 304 is optional. The BLE chip 302 includes a processor, a Bluetooth PHY, radio and transponders, RAM and Flash RAM, analog and digital 10 interfaces, and power management operations to operate in Bluetooth Lower Energy mode. A BLE antenna is also electrically and mechanically attached to the BLE chip 302 to transmit and receive the BLE signals. This allows the BLE chip 302 to communicate wirelessly with other devices.

The battery 306 is electrically connected to the BLE chip 302 and supplies the appropriate power to the BLE Chip 302. A QI wireless charging chip 307 is also electrically attached to the battery 306. An antenna is also electrically and mechanically attached to the QI chip 307 to receive power signals from a QI charger. Anytime that the antenna receives a usable voltage, the signal is sent to the QI chip 307 for conversion to the appropriate signal levels for recharging the battery. This power signal is then sent to the battery 306.

Golf Ball Software

When the accelerometer 303 detects that the golf ball 402 is moving, the accelerometer 303 signals the BLE chip 302, located inside of the golf ball 402, to wake up. In an alternative embodiment, the golf ball 402 wakes up when a certain transmission is received on the communications circuitry. In some cases, this movement is the impact of a golf club. In some embodiments, the extent of movement of the golf ball 402 could be calibrated to detect impacts of a golf club but not movement from transportation in a golf bag. Once awake, the golf ball's 402 BLE chip 302 will stay awake for 30-60 minutes, listening for requests from a smartphone 401. While awake, the BLE chip 302 also monitors the MR sensors 305 and the accelerometer 303 for an indication that the golf ball 402 has been hit by a golf club.

The accelerometer 303 and the MR sensors 305 send signals to the BLE chip 302 which records data from the golf ball 402 from the moment that it is hit until the ball comes to rest. In some embodiments, the signals are sampled at 1 kHz. The accelerometer 303 sends the velocity and acceleration data regarding the activity of the ball. Timers in the BLE chip 302 are used to time the flight of the golf ball. The accelerometer 303 also notes changes in direction from bounces off of the ground or other objects. The MR sensors 305 detect gravity by changing resistance as the gravity changes. The MR sensor signals (data) are sent to the BLE chip 302. This allows the spin of the golf ball to be measured. The frequency of the resistive signal from the MR sensor 305 is the rotational speed, and the magnitude is the direction in which the ball is spinning (rotation direction). A very small magnitude indicates that the spin is almost parallel to the earth, and a high magnitude shows that the spin is perpendicular to the earth. There is a point where the ball is spinning absolutely parallel to the earth where spin cannot be detected. In some embodiments, a second MR sensor 305 is used, where the second MR sensor is mounted 90 degrees offset from the first MR sensor to allow detection of the golf ball spin when the first sensor is spinning parallel to the earth. During flight, the processor in the BLE chip 302 stores the data from the sensors at an interval, perhaps every 100 msec, into a data array. In many embodiments, the data is timestamped with information from the BLE chip 302 timers. Data could be stored internally on the pc board 106 (possibly in the memory of the BLE chip 302) in the form of instantaneous acceleration readings, directly or calculated, from the accelerometer 303 in the x, y, and z directions.

In some embodiments, the accelerometer 303 component blacks out when the golf ball 402 velocity exceeds about 85 miles per hour, making it impossible to calculate its exit velocity through basic physics ($v=v0+at$), given that a golf ball 402 may travel 150-200 miles per hour in flight. The data in the period where the accelerometer 303 is blacked out could be ignored (although the timestamps are retained)

and extrapolated using available data. A portion of this data comes from the free fall equation. Upon the user indicating that the ball 402 is found, the phone 401 will attempt to connect to the ball 402 and pull the stored data from it.

The raw data is processed, either by the BLE chip 302 in the golf ball 402 of by the phone 401, to remove any erroneous readings due to the accelerometer's read-ceiling; the accelerometer can only read values to a certain point, once this ceiling is hit, the readings will all be the same until they become lower than the maximum possible read value. This is done by removing any identical readings at the beginning of the array. The original start time is retained, so that the hang time is accurate and so that the initial values can be extrapolated once the best-fit lines are calculated.

Another characteristic of the raw data are outliers on the trendline. Periodically, the accelerometer will produce a reading that is significantly different from the points surrounding it. This isn't due to an action on the ball, but rather the device sensitivity, environmental factors, etc. surrounding the pc board 106. To reduce the effect of these readings, every 10 data points are averaged out.

From here, any data at the tail end of the array is eliminated if they are deemed to be too similar to each other (for example, having the (x,y,z) reading being within 10 units of each other), indicative of the ball coming to a stop at the end of the shot. The data is also all shifted down to a starting point of (x:0, y:0, z:0, t:0) for ease of the calculations. Then, from the raw acceleration data, the velocity at each data point is captured using a simple area-under-the-curve calculation.

A linear regression is run on the x, y, and z components of the velocity readings. The regression algorithm comes from "regression-js [,] a JavaScript module containing a collection of linear least-squares fitting methods for simple data analysis. The regression algorithm converts the data into a linear equation $$Y=a+bX$$

These regression equations are the basis of the analytics calculations. The equations the analytics are based on a regression package for node.js [1]. Specifically, the analytics are based on the linear least-squares fitting model on the velocity data points. The algorithm starts with the data formatted as an array of pairs of independent and dependent data (i.e.: [[1,1], [2,2], [3,3] . . . ]). Therefore, the velocity data points (originally in the form of {x,y,z,t}) are split into parameters -- resulting in an array of all x values, all y values, all z values, and all t values. The x,y,z arrays are then paired with t and passed to the regression algorithm in succession. The algorithm returns the x-coefficient and the y-intercept of the fitted line, which gets stored as part of the velocity equation for its respective location vector.

Displacement equations are calculated for the x, y, and z vectors by integrating the velocity values following the power rule for integrals.

These two equations are used to calculate all of the following analytics in the x, y, and/or z directions. The resultant vectors are then combined when necessary.

After the parametric equations are calculated from the linear regression, the individual statistics about the shot are calculated using a combination of algebra, trigonometry, and calculus. The velocity equations are integrated to find the displacement equations, and the combination of these equations produce all the analytics shown to the user.

Hang Time. This is just the last reading's timestamp minus the first reading's timestamp.

Exit Velocity. This is taken from the velocity parametric equations. The instantaneous velocity is taken from time 0 and they are combined to get the resultant velocity vector.

Launch Angle. This is calculated by combining the x and y parametric equations and then using trigonometry to calculate the launch angle between the XY-plane and the Z-plane.

Apex Height. Since the XY-plane is the vertical plane (if the ball stays in the correct orientation), the apex height is either the x or y displacement curve's vertex or a combination of the two if the ball doesn't land with one of those axes ending up vertical.

Carry Distance. Calculated by doing a Reimann sum on the z-plane displacement vector. The accuracy of this is also dependent on the ball remaining in the correct orientation.

The Bluetooth chip 302 transmits this data (the data array) to a smartphone app. The app translates these data points into actionable insights. The app also features a "lost mode" which uses the Bluetooth chip to find proximity and direction to the ball, as well as play a sound with the buzzer. The pieces communicate with a smartphone app via Bluetooth to translate the data into actionable analytical points.

Golf Ball Location App

An app located on a cellphone 401 is used to communicate over Bluetooth to the golf ball 402. One aspect of the app is to assist in the location of golf balls 402 after they are hit. Initially, the golfer needs to locate the ball 402 within the range of the Bluetooth signal. While BLE claims an outdoor range of 1000 meters, obstacles could decrease the range. For instance, a golf ball 402 at the bottom of a 5-foot deep water hazard will have difficulty pushing the Bluetooth signal through the water. So the golfer needs to walk in the general direction and distance that the ball 402 was hit. Once the app receives the Bluetooth signal from the golf ball 402, the golfer can instruct the ball 402 to activate the buzzer 304, in one embodiment. The golfer could then follow the sound to the golf ball.

In an alternative embodiment (or in combination with the previous embodiment), the app uses a sweeping motion 403 to create multiple points to use to triangulate the location of the golf ball 402. The sweeping cellphone 401 embodiment describes a method used to locate objects using a cell phone 401. The method relies upon a mobile central interrogator, such as a smartphone 401, and objects 402 with Bluetooth LE (BLE) networking abilities. See FIG. 4.

The user holds the central interrogator 401 in his hands and rotates it ("sweeps") 403 it about his body. Using the algorithm in FIG. 6, software on the central interrogating device 401 is able to calculate the direction in which the golf ball 402 lies in two dimensions. The smartphone 401 sees the golf ball 402 location as a vector 404 by detecting the Bluetooth signals 405. The strength of the Bluetooth signal 405 will help with distance calculations. This method does not require a clear line of sight, as BLE signals pass through most objects. Since the method works best in two dimensions, it is best at finding golf balls 402 on the ground and is not ideal at locating balls 402 stuck in trees.

The central interrogator 401 could be a smartphone, a cell phone, a smartwatch, a tablet, a laptop computer, a notebook computer, smart glasses, an augmented reality device, a custom device, or any similar device. In still another embodiment, the central interrogator 401 could be built into a golf cart and display the location information on the windshield of the golf cart. The central interrogator 401 has a processor, a Bluetooth PHY, radio and transponders, RAM and Flash RAM, and a display screen. The central interrogator 401 may have cellular and WiFi capabilities.

Glossary

RSSI: Received Signal Strength Indicator. A value reported by a device that denotes the current strength of a received radio signal 405 such as Bluetooth Low Energy (BLE). This signal has a range of −100 to −26 decibels (dB).

Signal Pool: A rolling average of RSSI values that keeps track of the lowest and highest values received as well as the difference between the two.

Facing: Facing is the angle of the device relative to a starting position 403. Facing is determined by means of angle data from the device's 401 gyroscope. When initiated, the gyroscope calibrates its current orientation as the origin (0,0,0) 602. Only the y value (yaw) is taken into consideration when the facing is updated. The facing is used to determine the circle sector to which a particular RSSI reading can be attributed. See FIG. 5.

Heading: The predicted direction in which the user should turn in order to face the signal being tracked. This value is intended to only influence the device's current yaw value and therefore the user's Facing direction.

Movement: A change in the user's position, detected by parsing the weighted moving average of the dot product of each accelerometer readout and the previous readout. The weighted moving average is a normalized value which is calculated as follows:

where A is an accelerometer vector and
N is the number of samples.
MT=movement threshold=0.8
If m>MT, movement has occurred.

Description of Algorithm

When the user logs into the app and begins a session, whether on- or off-field, they will arrive at a screen prompting them to connect to their golf ball 402. Upon the user's command, the central interrogator 401 starts broadcasting a beacon to all nearby devices that match the golf ball's SSID. All available balls are listed, and the user must select their ball 402. Once the selection is made, the central interrogator 401 attempts to connect to the ball 402 via Bluetooth. Post-connection, the user is prompted to tap the button indicating they are ready to play, when they are ready. This prevents the ball from collecting false data from the player setting up to swing.

Figure 4:
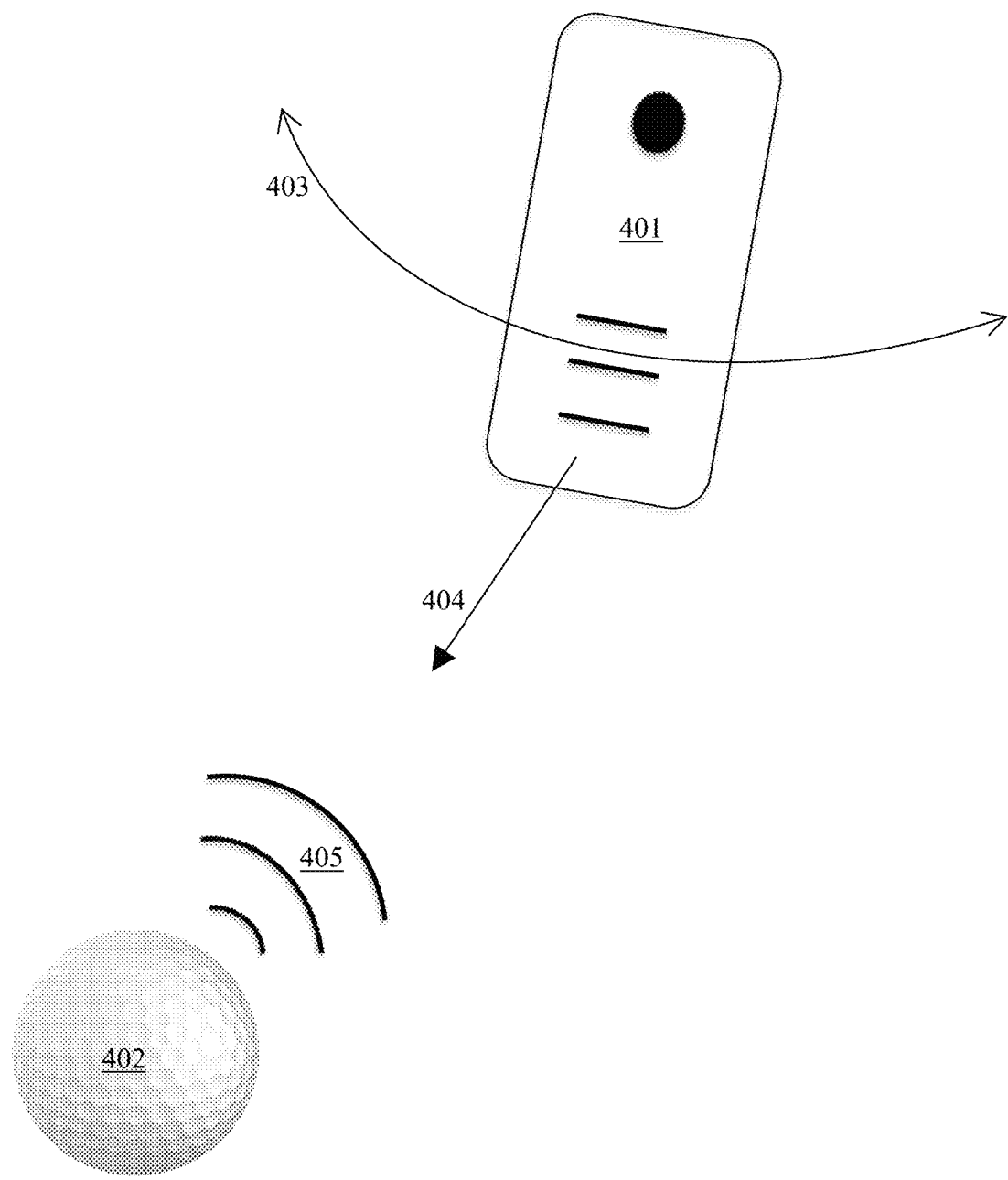
FIG. 4 shows the general relationship of the smartphone to the golf ball in the phone sweeping embodiment.

In FIG. 4, the user holds the central interrogator 401 and moves it in a circular motion 403. Based on yaw data from the accelerometer (one the smartphone 401), the interrogator's facing 404 is instantaneously updated. For each facing 404, the strength of Bluetooth LE signals 405 received from the golf ball 402 (RSSI) is calculated.

Figure 5:
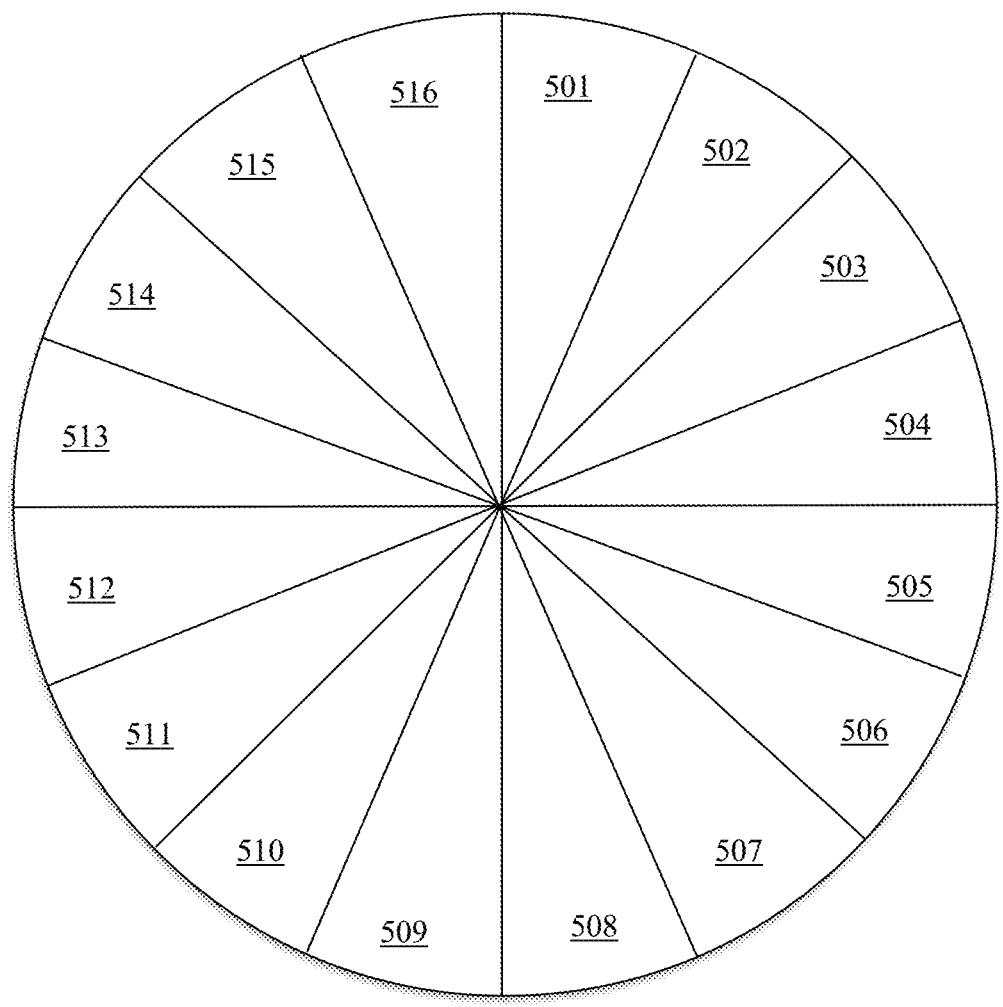
FIG. 5 shows the signal pool associated with the respective circle segment in the phone sweeping embodiment.

The area surrounding a user is visualized as a circle in FIG. 5 centered at the central interrogator. An array of 16 signal pools 501-516 is allocated, each one associated with a different circle segment. Therefore, each segment is 2π/16 radians wide (22.5°).

In FIG. 5, RSSI is requested once every second and is added to the signal pool 501-516 associated with the current facing (the gyroscope's yaw value). When a new RSSI value is added to a signal pool 501-516, the pool will first check for and discard skewed values (a skewed value occurs when abs(RSSI-RSSIavg))>30). Then all signal pools 501-516 are checked to find the pools with the highest RSSI values. If two or more pools share the highest RSSI value, the direction is determined by the pool with the smallest difference between the highest and lowest values.

The direction of the tracked item is indicated to the user as follows. A circle is drawn with a gradient from Red to Green, with red representing the lowest RSSI values with the largest RSSI difference, and green representing the highest RSSI values with the smallest RSSI difference. Colors on a gradient from red to green are drawn at other circle segments representing the relative RSSI values of the surrounding segments.

TABLE 3

| Signal Pool RSSI (Low to High) | Segment Color (RGB) |
| --- | --- |
| 16 | (255, 0, 0) |
| 15 | (240, 15, 0) |
| ... | ... |
| 1 | (0, 255, 0) |

Heading arrows are displayed when the user's facing does not fall within the circle segment with the highest RSSI and lowest signal difference. The direction of the arrow is determined by the dot product of the vector representing the circle segment determined to be the direction of the tag ($\vec{A}$) and the vector perpendicular to the user's facing ($\vec{B}$). If $\vec{A} \cdot \vec{B} > 0.4$, a right-facing arrow is displayed. If $\vec{A} \cdot \vec{B} < -0.4$, a left-facing arrow is displayed. For all other values of $\vec{A} \cdot \vec{B}$, no arrow is displayed. In other words, the display alerts the user to the direction of the tracked item relative to himself.

TABLE 4

| $\vec{A} \cdot \vec{B}$ | Display |
| --- | --- |
| −0.4 or Less | Left arrow |
| Between −0.4 and 0.4 | No arrow |
| Greater than 0.4 | Right arrow |

When movement is detected, the signal pools 501-516 are reset so both the highest and lowest RSSI values are the highest values for that pool.

Figure 6:
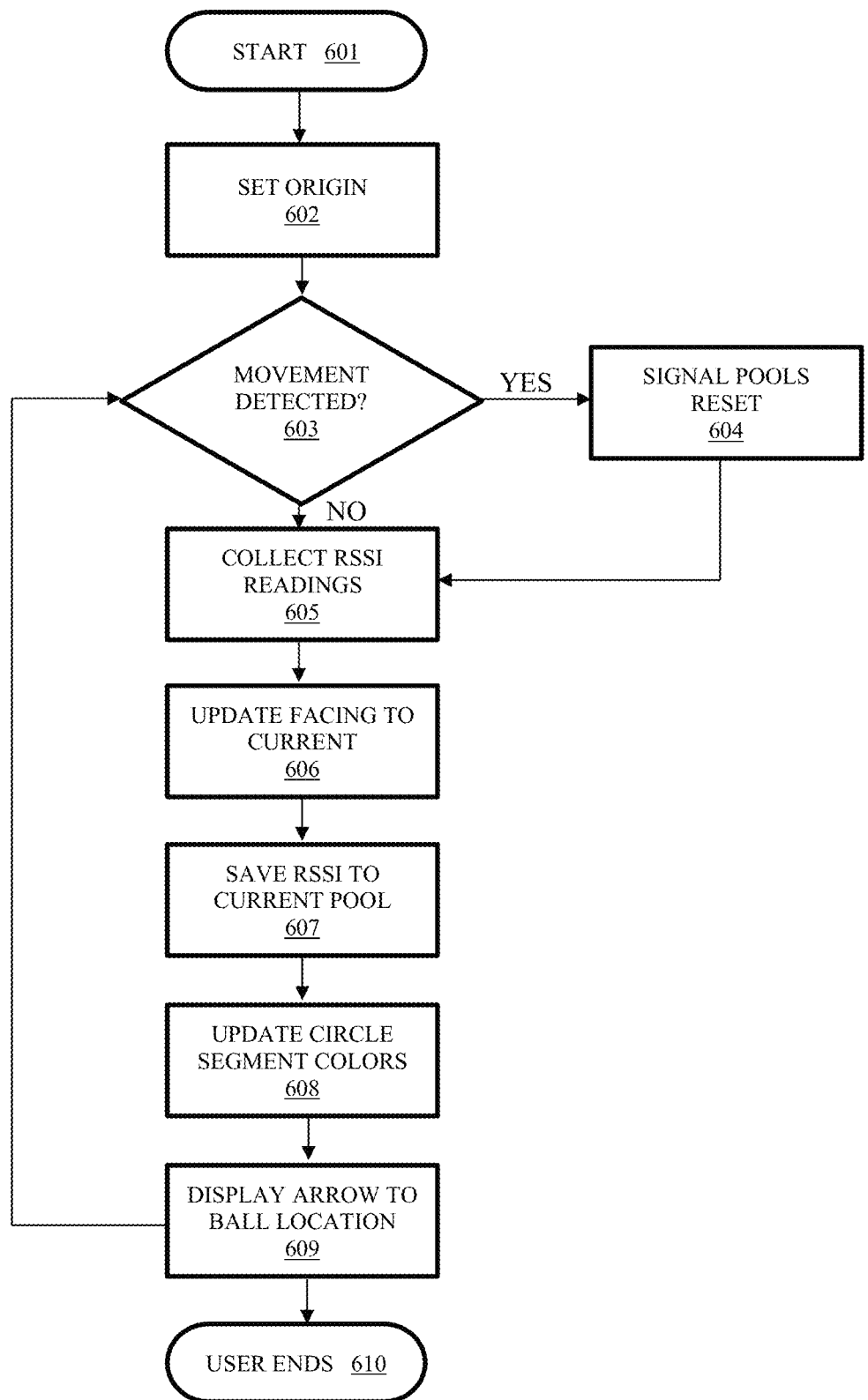
FIG. 6 is a flow chart showing the algorithm for the phone sweeping embodiment.

FIG. 6 shows a flowchart of the algorithm used to determine the location of the object. The flowchart starts 601 by setting the origin to the current gyroscope readings 602. If movement is detected 603, the signal pools are reset 604, and the process collects the RSSI readings 605. If no movement is detected 603, the pools are not reset, and instead, the algorithm proceeds immediately to collect the RSSI readings 605. Then the facing is updated to current 606. The RSSI is saved to the current signal pool 607. Then the circle segment colors are updated 608, and the arrow pointing to the ball direction is displayed 609. The process then repeats, checking for movement 603, until the user ends the process 610.

Golf Analytics App

A golfer opens our app on their phone 401 after or during a round of to view analytics and insights of their game. They have the ability to see which aspects of their game need the most work and how best to improve it. Golfers can also locate their ball during their round using the app by playing a sound and finding it through proximity and direction.

In some embodiments, once the golfer indicates that they're ready to take the shot, the phone 401 sends a key code to the ball 402 to start recording accelerometer data. This key code is received by the communications circuitry in the BLE processor 302 on the golf ball 402, and is used to wake up the BLE processor 302.

Figure 7:
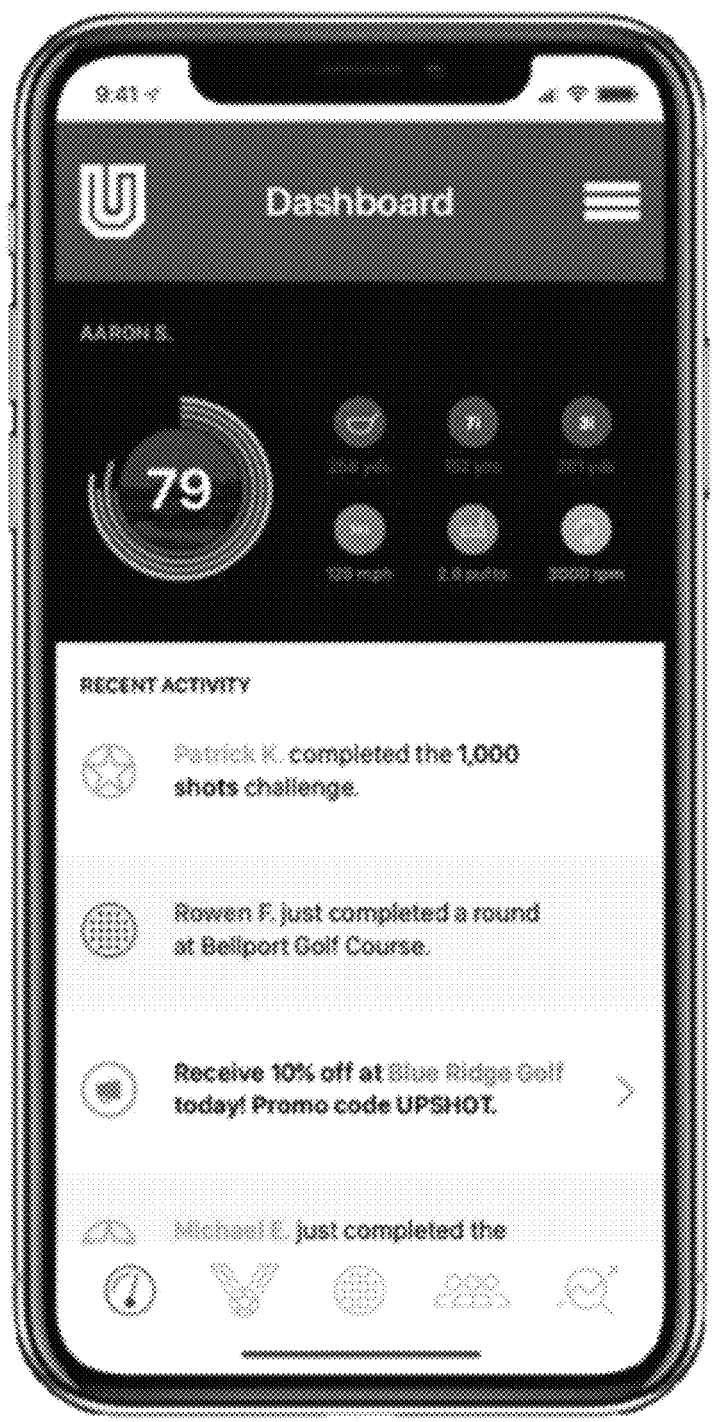
FIG. 7 is a screenshot of the dashboard of the user interface on the smartphone.

The initial screen for the app can be seen in FIG. 7. The user enters the app with an initial login user interface. The user can either create an account with an email and password or can login with Facebook. If they choose to login with Facebook we will collect the basic info we are allowed to and the list of their Facebook friends who also use the Upshot app. Upon first login, the user is presented with a screen to select the clubs they generally carry with them. This will be called their "golf bag" and can be edited in settings. The dashboard is essentially an upshot golf newsfeed. It contains the Raven score and stats of both the user and community members (friends or people playing the same course); challenges completed by the user and friends; and promotions (primarily for golf equipment). The screen also has statistics on a recent round of golf: the recent wood drive went 258 yards, the 7 iron went 162 yards, and the 3 iron went 201 yards. The ball speed was 128 miles per hour and had a rotation of 3000 rpm. That round took an average of 2.6 putts per hole.

In one embodiment, the rotation of the golf ball is calculated using a gyroscope located inside of the accelerometer 303 mounted on the pc board 106 inside of the golf ball 402. The data from the accelerometer 303 is collected and stored in the memory of the BLE chip 302. Typically, an accelerometer chip 303 with a gyroscope will return the number of degrees of rotation per second in each axis that the gyroscope detects. In some accelerometer chips 303 (the ST Microelectronics LSM6DS3), this number can be detected up to a maximum of 2000 degrees per second, or about 360 rpm. Other accelerometer chips 303 may have larger ranges. Because the accelerometer chip 303 returns the spin in the x, y, and z axis, the data provides the direction of spin as well.

In a second embodiment, the magnetoresistant sensor (MR) 305 is used to measure changes in the resistivity of a ferromagnetic material carrying a current due to a magnetic field. This technique allows for rotation rates in the tens of thousands of RPMs. The MR sensor returns an analog signal that is the frequency of rotation. This signal could be inputted to a pin on the BLE chip 302 that is configured as a counter to count the number of cycles, a number that corresponds to the rotation of the golf ball 402. The signal from the MR sensor could also be sent to an analog pin on the BLE chip 302 to measure the magnitude of the signal, indicating the direction of spin. By utilizing the Chirp Z-Transform time-frequency domain analysis method based on the rolling window of a Blackman window function we can accurately measure the spin rate of a high g force high spin projectile. This has been tested and proven on 155 mm artillery projectile. This method is especially effective for high spin & high g projectile launch environment. The MR sensor and the gyroscope, as well as other solutions for detecting and measuring rotation, are referred to as spin detectors 305.

Figure 8:
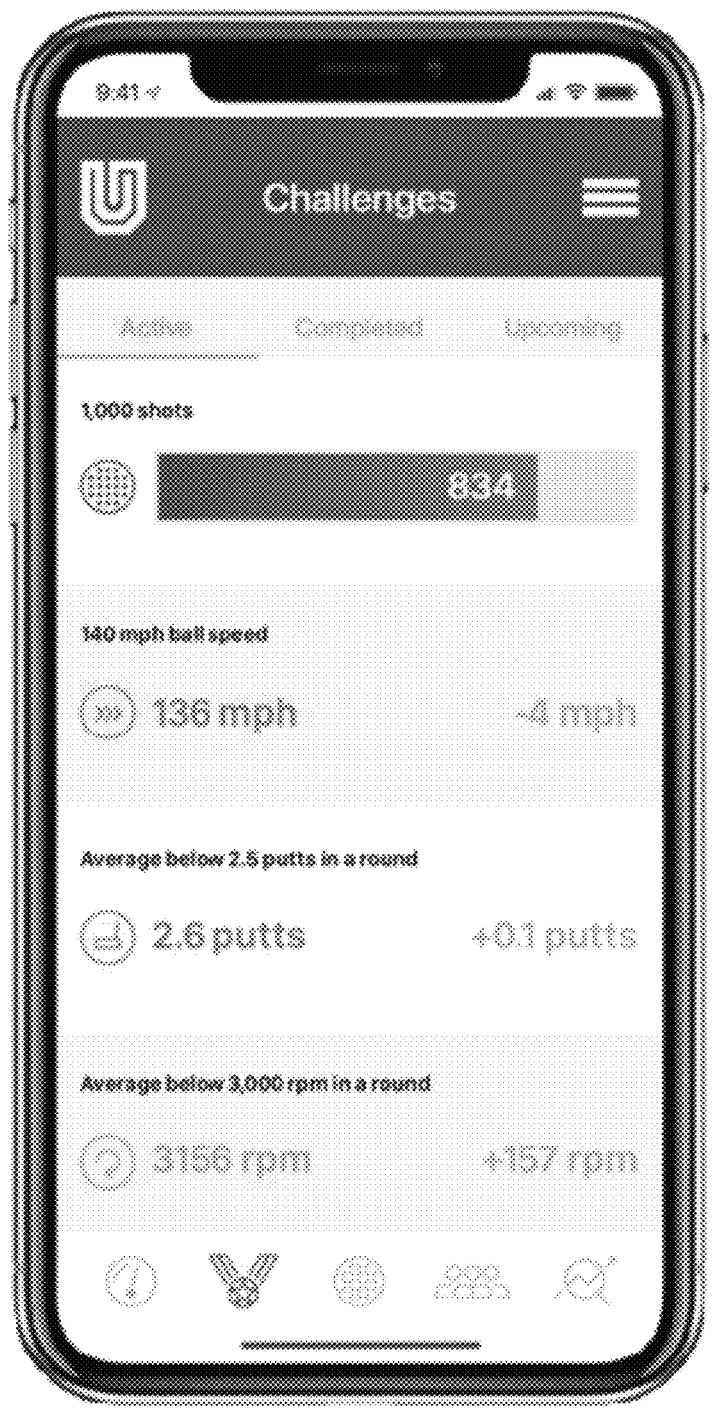
FIG. 8 is a screenshot of the challenges screen on the cell phone app.

FIG. 8 shows a challenges page contains a series of challenges that can be achieved during a round of golf. "Take 1,000 shots" and "Drive a ball 300 yards" might be some examples of challenges. The page has 3 tabs—active, upcoming, and completed. When a user has taken 150 shots—"Take 100 shots" would be in completed, "Take 1,000 shots" would be in active, and "Take 10,000 shots" would be in upcoming. Statistics on the average ball speed and rotation are displayed, as are the average number of putts in a round.

Figure 9:
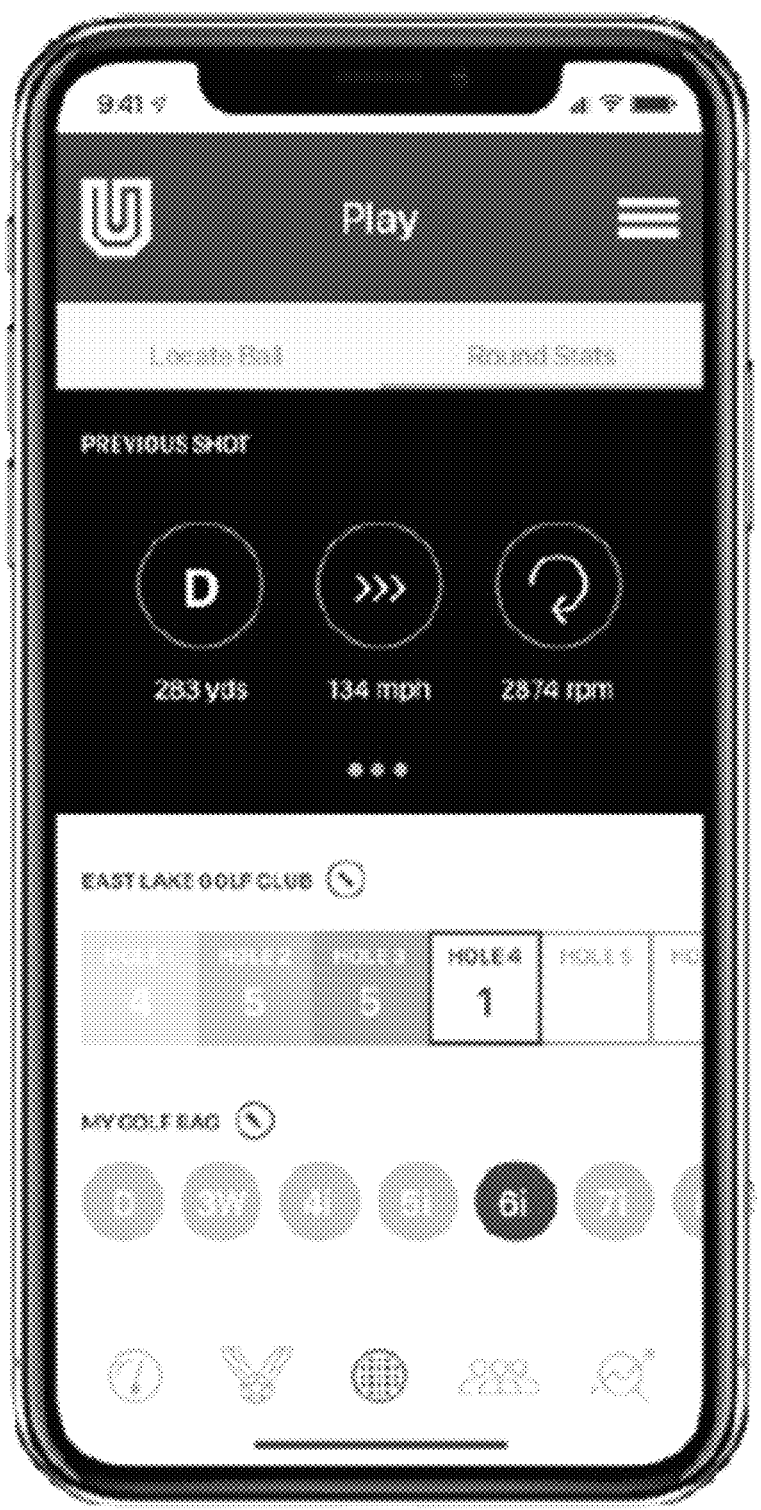
FIG. 9 is a screenshot of the play screen.

Looking at FIG. 9, the play screen is displayed. The screen consists of two tabs—Round Stats and Ball Locator. The Round Stats shows the user's current "Raven score". The Raven Score is calculated by weighting all aspects of a golf shot into a single score. This is comprised of ball velocity, spin rate, spin direction, shots over par, and number of putts. Additional statistics and graphs, such as direction of spin, the force hitting the ball, the height of drive, the trajectory of flight, and the carry could also be displayed. the app also allows the user to select their club for the upcoming shot or to edit the club that was used on past shots. The primary clubs offered to be selected should all be from the user's "golf bag". The screen also indicates a predicted scoresheet. Initially, we will not have course data, so the sheet should just show the shots for each hole and not compare to any course-specific information such as what par each hole was.

The Ball Locator works as follows: the user can't find the ball, selects the ball finding tab. Based on the metrics we can calculate, we suggest a distance and direction to search. Once within the range of Bluetooth, the user can attempt to "search" for the ball. This triggers the app to attempt a Bluetooth connection with the ball. If it is successful, we can give the user a more precise description of the direction and distance to the ball, using the sweeping algorithm described above. The user could then "ping" the ball when they are near it, which would trigger the sound if the ball is lost in tall grass etc. If the ball cannot be connected via Bluetooth in the original search, then the user is informed they are not close enough to the ball. This shouldn't occur too often as the Bluetooth should be able to function from a pretty good distance (about ~200 yards).

Figure 10:
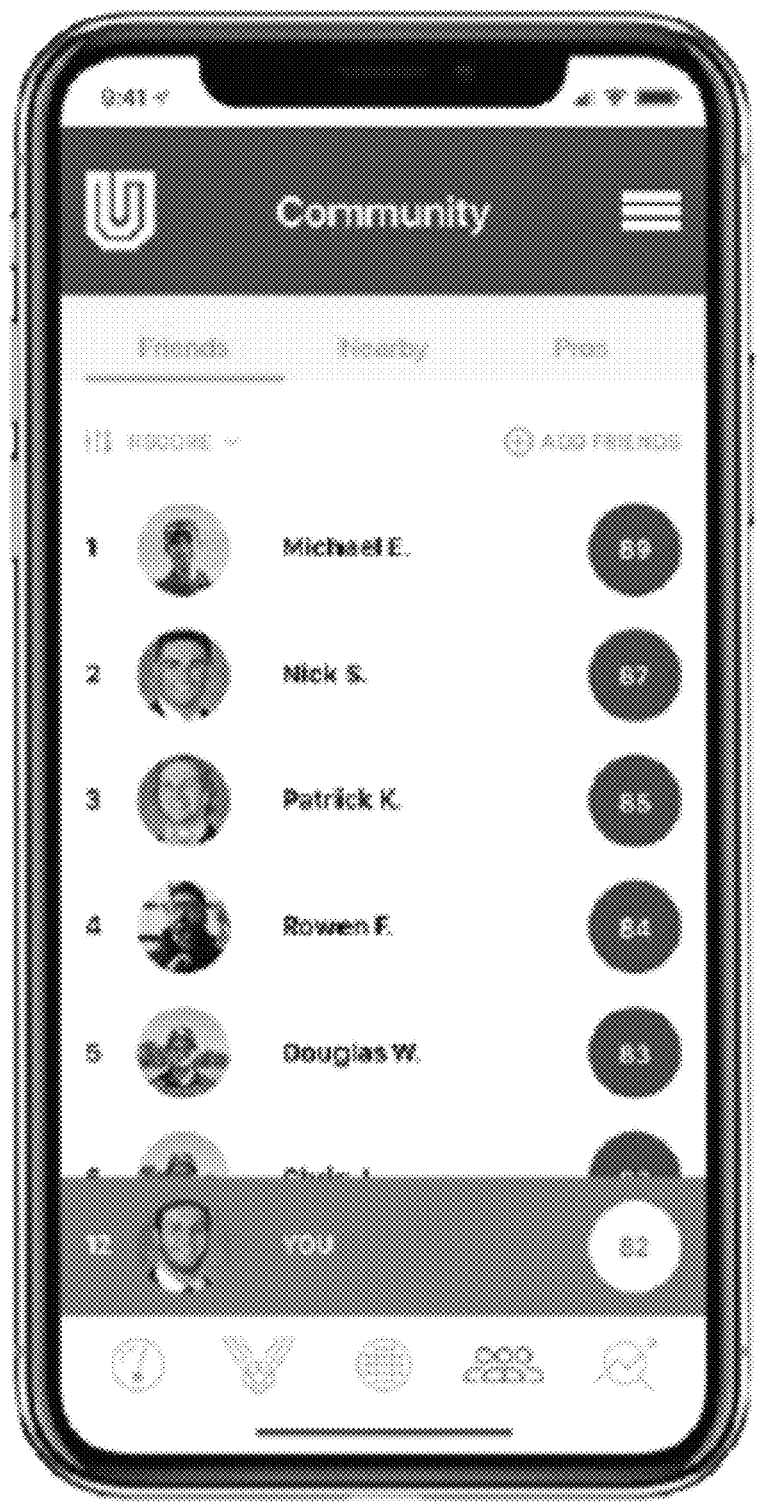
FIG. 10 is a screenshot of the community screen.

FIG. 10 shows the community page. With this page the user can add friends, if the user is logged in with Facebook then all of their Facebook friends who are using the app should automatically be made their friend on Upshot. It offers the ability to see locals, friends, family, professionals "Raven Score" and allow them to click in to see specific averages. This is all done through the use of the Facebook login SDK. When a user logs in to an app using Facebook, one of the rights that they grant is for the app to see the list of users who are their Facebook friends that have also logged in to the app. Users will have the right to adjust their privacy settings within the app. If a user is on the most visible setting, the app will share their most recent round scores, and other golf statistics, via the community feed. If they are in the most private setting, no data from any of their golf activity will be shared with anyone else using the app.

Figure 11:
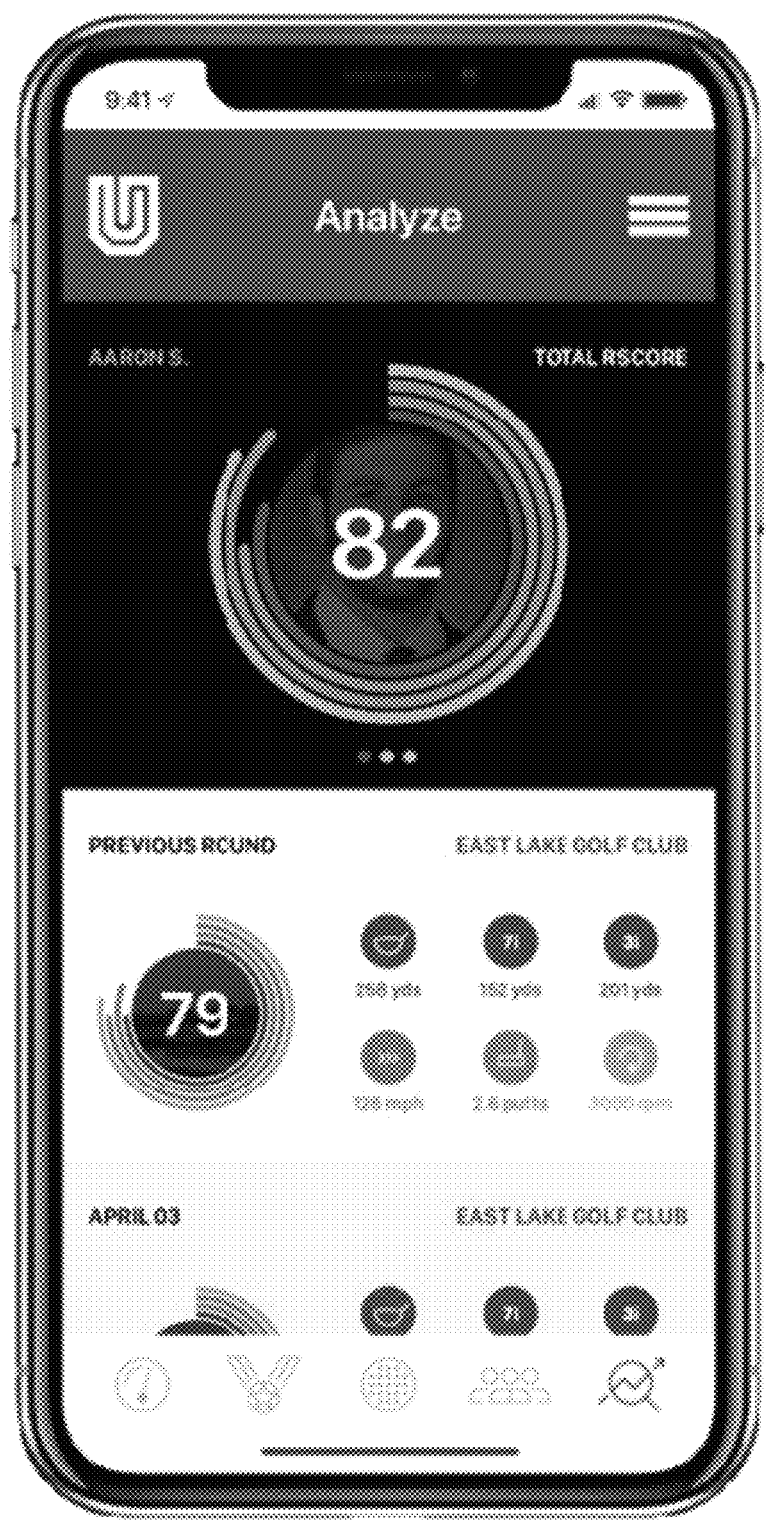
FIG. 11 is a shot of the analyze screen.

FIG. 11 shows the screen for the analyze screen. With this screen, a user can see their specific rounds and data points from each round, including Average drive, Putts/hole, etc. Tapping a specific round should open a modal containing further analysis: the worst club was X, the weakest part of the game was Y, most improved part of the game was Z. In this screen, the data from the round of golf is analyzed and compared to the data from other golfers to determine techniques to improve the golf game. These techniques are then suggested to the golfer via the app to improve the golf game. For instance, if the golf ball 402 is showing a topspin, the golfer is advised to adjust his point of striking the ball lower to cause a more direct hit on the ball 402.

The app will aggregate and analyze data from a round to diagnose symptoms of a user's golf game and provide concise and actionable feedback. Each shot and the corresponding data is labeled with the club that was used. At the completion of a session, all of the shots are sorted by club type. Within each club type, every shot is analyzed for both performance (further distance is better, a 6 iron has an expected spin rate of around 6000 rpm, etc.) and consistency with all of the other shots the user hit with that club. Clubs with the lowest performance and/or consistency ratings are collected along with the top factors that indicate the low performance or consistency. Each data point along with the specific nature of the error is pre-mapped to general feedback about what is likely going wrong and why. The concluding analysis of a session may appear on the screen as follows:

The least efficient club was the 7 iron

24% of shots were poor due to high spin rate

The average launch angle was ~44% compared to an expected 38%

This suggests an under strike could be occurring in your swing. Y and Z are products/drills that have been shown to help correct this error.

The app may also compute a combined career score based on usage and improvement over time. The user starts at a score of 0 and gains points with each session and challenge completed. Each session awards points based on the number of strokes hit times a multiplier based on how much the user improved an aspect of their game during that time. For example, 100 strokes hit*1.2 multiplier for correcting the approximate launch angle of the 5 iron=120 points. Each challenge is assigned a point value in advance. For example, complete a round with under 2.5 putts per hole might be worth 100 points. These scores will then be displayed on a user's profile and will be used to establish a leaderboard within the social media aspects of the mobile application.

While the above invention specifies a golf ball, the same circuitry and software could be used to analyze a baseball, a hockey puck, a polo ball, a basketball, a football, a Frisbee, a softball, a soccer ball, a volleyball, a tennis ball, a handball, a rugby ball, a table tennis ball, a badminton birdie, a bowling ball, a field hockey ball, a cricket ball, a lacrosse ball, a curling rock, or a bocce ball. In many of these sports, the precise location of the ball is important to scoring, and the location of the BLE chip could be used with beacons to determine precisely whether, for instance, a hockey puck (or soccer ball, etc) has crossed into the net. It could also be used in volleyball or tennis to determine if the ball is in or out of bounds. The algorithms described herein could also be used for determining the characteristics of a bullet as well as where it hit the target (allowing automatic scoring). The pc board and its software could be used to analyze the spinning of bearings for bicycle tires, automotive wheels (and other rotating components), and in other devices with rotating components.

The foregoing devices and operations, including their implementation, will be familiar to, and understood by, those having ordinary skill in the art. All sizes used in this description could be scaled up or down without impacting the scope of these inventions. All angles have a tolerance of ±10 degrees.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

The invention claimed is:

1. A system for monitoring a golfer's performance, the system comprising:
    a golf ball with embedded electronics, the golf ball comprising:
    a processor electrically connected to golf ball communications circuitry and memory;
    a Magnetoresistive sensor electrically connected to the processor, said Magnetoresistive sensor directing data regarding rotation of the Magnetoresistive sensor to the processor, where the processor converts the data regarding the rotation of the Magnetoresistive sensor into a rotation speed and a rotation direction, said rotation speed determined by a frequency of the data and said rotation direction determined by a magnitude of the data, through a calculation and stores said rotation speed and said rotation direction in the memory;
    and the golf ball mechanically encompassing the processor and the Magnetoresistive sensor;
    and a central interrogator comprising: a central interrogator processor;
    central interrogator communications circuitry electronically connected to the central interrogator processor, the central interrogator communications circuitry wirelessly connected to the golf ball communications circuitry;
    and a display screen electrically connected to the central interrogator processor;
    wherein application software executes on the central interrogator processor, said application software interrogates the golf ball through the central interrogator communications circuitry for the rotation speed and said rotation direction regarding the rotation of the Magnetoresistive sensor, the application software derives analytics on the golfer's performance from the rotation speed and the rotation direction for display on the display screen.

2. The system of claim 1 wherein the data sent by the golf ball to the central interrogator comprises hang time.

3. The system of claim 1 wherein the data sent by the golf ball to the central interrogator comprises an exit velocity.

4. The system of claim 1 wherein the data sent by the golf ball to the central interrogator comprises a launch angle.

5. The system of claim 1 wherein the data sent by the golf ball to the central interrogator comprises a carry distance.

6. The system of claim 1 further comprising a buzzer in the golf ball electrically connected to the processor.

7. The system of claim 6 wherein the central interrogator processor wirelessly transmits an instruction to the golf ball to activate the buzzer.

8. The system of claim 1 further comprising locator software in the central interrogator that interrogates an RSSI signal from the golf ball communications circuitry as detected by the central interrogator communications circuitry; compares a location of the central interrogator to the RSSI signal; and calculates a location of the golf ball based on a plurality of central interrogator location and RSSI signal data pairs.

9. The system of claim 1 wherein the central interrogator is a smartphone.

10. A method for analyzing performance of a game of golf, the method comprising: detecting an impact with an accelerometer;
    measuring rotation with a Magnetoresistive sensor, said Magnetoresistive sensor sending a rotation signal to a microprocessor located inside of a golf ball, said microprocessor electrically connected to a communications interface;
    measuring acceleration with the accelerometer, said accelerometer sending an acceleration signal to the microprocessor;
    converting the rotation signal into a rotation speed and a rotation direction, said rotation speed determined by a frequency of the rotation signal and said rotation direction determined by a magnitude of the rotation signal, through a calculation in the microprocessor;
    storing the rotation speed, the rotation direction, and the acceleration signal in a memory electrically connected to the microprocessor; and sending the rotation speed, the rotation direction, and the acceleration signal to the communications interface for transmission to a central interrogator for analysis on a golfer's performance.

11. The method of claim 10 wherein a timestamp is stored in addition to the rotation speed and the acceleration signal.

12. The method of claim 11 wherein the timestamp is sent to the communications interface.

13. A golf ball with embedded electronics, the golf ball comprising:
   an accelerometer;
   a processor electrically connected to the accelerometer, communications circuitry, and memory, wherein the processor stores accelerometer data from the accelerometer in the memory;
   a Magnetoresistive sensor electrically connected to the processor, said Magnetoresistive sensor directing rotation data regarding rotation of the Magnetoresistive sensor to the processor, where the processor converts the rotation data regarding the rotation of the Magnetoresistive sensor into a rotation speed and a rotation direction, said rotation speed determined by a frequency of the rotation data and said rotation direction determined by a magnitude of the rotation data, through a calculation and stores said rotation speed and said rotation direction in the memory;
   the golf ball encompassing the processor and the Magnetoresistive sensor;
   and the communications circuitry configured to communicate the accelerometer data, the rotation direction, and the rotation speed to a central interrogator for analysis on a golfer's performance.

14. The golf ball of claim 13 wherein the communications circuitry is further configured to communicate exit velocity as calculated by the processor to the central interrogator.

* * * * *